(12) United States Patent
Kraus et al.

(10) Patent No.: US 7,960,680 B2
(45) Date of Patent: Jun. 14, 2011

(54) OPTOELECTRONIC DEVICE FOR EMITTING ELECTROMAGNETIC RADIATION WITH CONTROLLABLE EMISSION INTENSITY AND CONTROL METHOD

(75) Inventors: Robert Kraus, Regensburg (DE); Thomas Reiners, Bachhagel (DE)

(73) Assignee: OSRAM Gesellschaft mit beschränkter Haftung, München (DE)

( * ) Notice: Subject to any disclaimer, the term of this patent is extended or adjusted under 35 U.S.C. 154(b) by 606 days.

(21) Appl. No.: 12/074,541

(22) Filed: Mar. 3, 2008

(65) Prior Publication Data
US 2008/0316572 A1    Dec. 25, 2008

(30) Foreign Application Priority Data
Mar. 1, 2007   (DE) .......................... 10 2007 010 039

(51) Int. Cl.
*G02F 1/07* (2006.01)
(52) U.S. Cl. .................... 250/216; 250/221; 250/208.1; 250/552
(58) Field of Classification Search .................. 327/112; 348/794; 250/216, 221, 208.1, 239; 353/85, 353/87, 119, 122, 51–61
See application file for complete search history.

(56) References Cited

U.S. PATENT DOCUMENTS
2005/0088209 A1 * 4/2005 Wessels .................... 327/112

FOREIGN PATENT DOCUMENTS
| DE | 198 48 925 | 4/2000 |
| DE | 10 2005 020 085 | 11/2006 |
| EP | 0 625 843 | 5/1994 |
| WO | WO 2005/121641 | 6/2005 |
| WO | WO 2007/007235 | 1/2007 |

* cited by examiner

*Primary Examiner* — Tony Ko
(74) *Attorney, Agent, or Firm* — Cohen Pontani Lieberman & Pavane LLP

(57) ABSTRACT

An optoelectronic device for emitting electromagnetic radiation with a controllable emission intensity comprises, at least one optoelectronic component (100) which is adapted for generating, in operation, electromagnetic radiation (90), a first electronic element (200) and a second electronic element (300). The first electronic element (200) is adapted for controlling the emission intensity of the electromagnetic radiation (90), generated by the optoelectronic component (100), within a first intensity range, and the second electronic element (300) is adapted for controlling the emission intensity of the electromagnetic radiation (90), generated by the optoelectronic component (100), within a second intensity range.

38 Claims, 7 Drawing Sheets

OPTOELECTRONIC DEVICE FOR EMITTING ELECTROMAGNETIC RADIATION WITH CONTROLLABLE EMISSION INTENSITY AND CONTROL METHOD

RELATED APPLICATION

This patent application claims the priority of German patent application no. 10 2007 010 039.8 filed Mar. 1, 2007, the disclosure content of which is hereby incorporated by reference.

BACKGROUND OF THE INVENTION

An optoelectronic device for emitting electromagnetic radiation is disclosed. Furthermore, a method for controlling an emission intensity of an electromagnetic radiation generated in the operation of an optoelectronic device is disclosed.

During the operation of an optoelectronic device which can emit electromagnetic radiation, it may be required to control the emission intensity of the emitted electromagnetic radiation.

SUMMARY OF THE INVENTION

One object of the present invention is to provide an optoelectronic device for emitting electromagnetic radiation having a controllable emission intensity, and to provide a method for controlling the emission intensity.

These and other objects are attained in accordance with one aspect of the present invention directed to an optoelectronic device comprising:

at least one optoelectronic component which is suitable for generating electromagnetic radiation when operating, a first electronic element and a second electronic element, wherein the first electronic element is suitable for controlling the emission intensity of the electromagnetic radiation generated by the optoelectronic component within a first intensity range, and the second electronic element is suitable for controlling the emission intensity of the electromagnetic radiation generated by the optoelectronic component within a second intensity range.

In particular, the first electronic element and the second electronic element can be set up for controlling and changing the emission intensity of the electromagnetic radiation emitted by the optoelectronic component within the first and within the second intensity range, respectively. The emission intensity of the optoelectronic device can be controlled, for example, by changing the emission intensity of the electromagnetic radiation generated by the optoelectronic component. In this context, the emission intensity of the optoelectronic component can be equal to the emission intensity of the optoelectronic device. As an alternative, the emission intensity of the optoelectronic device can also be different from the emission intensity of the optoelectronic component, for example proportional thereto.

Another aspect of the present invention is directed to a method for controlling the emission intensity of the optoelectronic device, in which the electromagnetic radiation is generated by at least one optoelectronic component, the emission intensity of the electromagnetic radiation generated by the optoelectronic component is controlled within a first intensity range by means of a first electronic element and the emission intensity of the electromagnetic radiation generated by the optoelectronic component is controlled within a second intensity range by means of a second electronic element.

The first electronic element and the second electronic element can be adapted for, independently of one another, changing and controlling the emission intensity of the electromagnetic radiation generated by the optoelectronic component, wherein a particularly effective, efficient and/or variable control of the emission intensity of the optoelectronic device can be obtained especially from the combination of the first and second electronic element.

In one embodiment, the electromagnetic radiation comprises a wavelength or a range of wavelengths, wherein the wavelength or the range of wavelengths can be preferably within a range which comprises ultraviolet, visible and infrared radiation. The electromagnetic radiation particularly preferably has visible radiation with a single- or mixed-color spectrum. A spectrum can be a spectral distribution of electromagnetic radiation and be equal to another spectrum if the respective spectral components and their respective relative intensities are equal for both spectra, wherein the absolute intensity of one spectrum can deviate from the absolute intensity of the further spectrum.

In a further embodiment, the first and the second intensity range are at least partially different from one another. In particular, this can mean that the first intensity range comprises an emission intensity or a range of emission intensities which are not within the second intensity range. Furthermore, the second intensity range can comprise an emission intensity or a range of emission intensities which are not within the first intensity range. In addition, the first and the second intensity range can partially overlap so that a range of overlap of emission intensities lies both in the first and in the second intensity range. As a result, the emission intensity of the optoelectronic device can be changed and controlled by means of the first and by means of the second electronic element within this range of overlap of emission intensities.

Furthermore, the first intensity range and the second intensity range can adjoin one another so that, for example, a certain emission intensity can be a boundary for both intensity ranges. For example, such certain emission intensity can represent the lower boundary of the first intensity range and at the same time the upper boundary of the second intensity range or vice versa Thus, if the emission intensity, for example in the first intensity range, is changed by means of the first electronic element in such a manner that the certain emission intensity which represents the lower boundary of the first intensity range and the upper boundary of the second intensity range is reached, the emission intensity can also be changed further in the second intensity range by means of the second electronic element. If, in contrast, the certain emission intensity which represents the lower boundary of the first intensity range and the upper boundary of the second intensity range is reached when controlling the emission intensity in the second intensity range, the emission intensity can be controlled and changed further in the first intensity range by means of the first electronic element.

It is especially due to the coaction of the first and second electronic element that the optoelectronic device can exhibit an overall intensity range of the controllable emission intensity of the electromagnetic radiation generated by the optoelectronic component, which is extended compared with the first and the second intensity range. In particular, the first and the second electronic element can thus act additively so that the emission intensity of the optoelectronic component, and thus of the optoelectronic device, can be controlled within an overall intensity range which in each case would not be accessible by itself by means of the first electronic element or the second electronic element.

Furthermore, one of the intensity ranges, for instance the first intensity range, can comprise a first maximum emission intensity of the electromagnetic radiation emitted by the optoelectronic device. This can mean that the emission intensity can be controlled or changed, respectively, by means of the first electronic element in such a manner that electromagnetic radiation having the first maximum emission intensity can be radiated by the optoelectronic device. Furthermore, the first intensity range can have a first minimum emission intensity and be limited by the first maximum and the first minimum emission intensity. In addition, the other intensity range, that is to say, for example, the second intensity range, can comprise a second maximum and a second minimum emission intensity of the electromagnetic radiation emitted by the optoelectronic device, which limit the second intensity range. This can mean that the emission intensity can be controlled or changed, respectively, by means of the second electronic element in such a manner that electromagnetic radiation can be emitted with the second minimum emission intensity by the optoelectronic device. In this context, the first maximum emission intensity can be greater than the second maximum emission intensity and the first minimum emission intensity can be less than the second minimum emission intensity. The first maximum emission intensity can be greater than or equal to the first minimum emission intensity. As a result, the overall intensity range can be limited by the second minimum emission intensity and the first maximum emission intensity and control within these limits is possible within the first and within the second intensity range, respectively, due to the first and the second electronic element. Due to the coaction of the first and second electronic element, the contrast ratio of the optoelectronic device, that is to say the ratio of maximum to minimum emission intensity, can thus be increased.

In a further embodiment, the optoelectronic component is suitable and/or arranged for generating electromagnetic radiation when a current is impressed. In this context, the emission intensity of the electromagnetic radiation generated can be particularly preferably proportional to the impressed mean current. In particular, the first electronic element and/or the second electronic element can be suitable and/or arranged for controlling and changing the mean current which is applied to the optoelectronic component and thus impressed on it. The current impressed on the optoelectronic component can be particularly preferably a direct current.

In a further embodiment, the current applied to the optoelectronic component is controllable. As a result, the mean current can be controlled and changed by controlling the current intensity. The first electronic element and/or the second electronic element particularly preferably exhibit for this purpose a device for current intensity control, for example a controllable current source in which the current impressed on the optoelectronic component can be controlled and changed by means of a predeterminable manipulated variable, for instance a voltage, a current, a resistance or another electrical quantity.

In a further embodiment, the current applied to the optoelectronic component is pulsed in time. This can mean that a current having a particular preferably constant current intensity is impressed on the optoelectronic component over a particular first time, the on-time and, following this, no current is impressed on the optoelectronic component over a particular second time, the off-time. The optoelectronic component can thus be alternately operated in accordance with the duration of the on- and off-time, respectively, by repeatedly sequencing the on- and off-times. In this context, the mean current applied to the optoelectronic component is obtained due to the so-called duty ratio, that is to say the ratio of on-time to off-time, taking into consideration the current intensity during the on-time. Controlling the duty ratio thus makes it possible to control and change the mean current impressed on the optoelectronic component and thus the emission intensity of the electromagnetic radiation generated by it. The controlling and changing of the duty ratio, which is also called pulse width modulation, can be arranged here in such a manner that the sum of the on-time and of the off-time, that is to say the duration of the period, is kept constant. Furthermore, either the on- or the off-time, for example, can also be kept constant and the other switching time in each case can be varied for controlling and changing the emission intensity. For controlling the current by means of pulse width modulation, the first and/or the second electronic element can have a current source, for example a constant current source or a controllable current source, and a time-controlled switch. The time-controlled switch which can comprise, for example, a transistor or a relay, can be suitable and/or set up for alternately changing between on- and off-state during the on- and off-time, respectively, and thus provide for a pulsed operation of the optoelectronic component in the manner described above. In this arrangement, the time-control switch can be connected in series to an output of the current source as a component independent of the current source, or act as a component of the current source onto the output of the current source. Furthermore, the time-control switch can change between on- and off-state by means of a periodically acting control signal, for instance a periodic pulse-shaped signal from a pulse generator. The duty ratio of the current applied to the optoelectronic component can thus be controlled and changed by controlling and changing the control signal.

In a further embodiment, the first and/or the second electronic element comprise an electrooptical dimmer which exhibits controllable and changeable transmission for the electromagnetic radiation generated by the optoelectronic component. In this arrangement, the electrooptical dimmer can structurally sequentially follow the optoelectronic component in the direction of emission of the electromagnetic radiation. This can mean that the emission intensity of the electromagnetic radiation generated by the optoelectronic component can be controlled and changed by the electrooptical dimmer by controlling and changing the transmission characteristic. For example, the electrooptical dimmer can comprise a thin film transistor and/or a liquid crystal layer. The liquid crystal layer can be arranged here, for example, between two transparent electrodes. By applying a controllable electrical signal, for example a voltage or an electrical field, to the electrodes, for example, the transmission characteristics of the liquid crystal layer can be changed by changing and controlling the alignment of the liquid crystals. In particular, the electrooptical dimmer can directly structurally sequentially follow the optoelectronic component in the direction of emission, which can mean that no further component is arranged between the optoelectronic component and the electrooptical dimmer. In this arrangement, the electrooptical dimmer can include, for example, an electrooptical layer which is arranged on or above the optoelectronic component.

In addition, the optoelectronic device can have an optical element which structurally sequentially follows the optoelectronic component in the direction of emission of the electromagnetic radiation. In this arrangement, the electrooptical dimmer can directly structurally sequentially follow the optical element. In particular, the electrooptical dimmer can also be arranged on the optical element or be constructed as part of it. The optical element can be, for example, a lens, a diffusion disc, a wavelength conversion element for changing the spectrum of the electromagnetic radiation generated by the optoelectronic component, a polarizer, a wave-plate or a polarization-selective reflector or a combination thereof.

In a further embodiment, the optoelectronic component comprises a semiconductor light-emitting diode (LED) or is an LED. In this context, the LED can preferably emit single- or mixed-color radiation. In this arrangement, the LED can preferably exhibit a sequence of semiconductor layers with one or more active areas which generates or generate, respectively, electromagnetic radiation, particularly when impressed with a current, in operation. In a particularly preferred manner, an LED can be excited here to generate electromagnetic radiation by impressing a current with a controllable current intensity and a pulsed current.

In a further embodiment, the semiconductor layer sequence is arranged as epitaxial layer sequence, that is to say as epitaxially grown semiconductor layer sequence. In this arrangement, the semiconductor layer sequence can be arranged, for example, on the basis of an inorganic material, for instance of InGaAlN, such as, for instance, GaN thin film semiconductor chips. InGaAlN-based semiconductor chips include particularly those in which the epitaxially produced semiconductor layer sequence which, as a rule, has a layer sequence of different individual layers, contains at least one single layer which exhibits a material from the III-V-compound semiconductor material system $In_xAl_yGa_{1-x-y}N$ with $0 \leq x \leq 1$, $0 \leq y \leq 1$ and $x+y \leq 1$. As an alternative or additionally, the semiconductor layer sequence can also be based on InGaAlP, that is to say that the semiconductor layer sequence exhibits different individual layers of which at least one single layer exhibits a material from the III-V-compound semiconductor material system $In_xAl_yGa_{1-x-y}P$, with $0 \leq x \leq 1$, $0 \leq y \leq 1$ and $x+y \leq 1$. As an alternative or additionally, the semiconductor layer sequence can also exhibit other III-V-compound semiconductor material systems, for example an AlGaAs-based material, or II-VI-compound semiconductor material systems.

The semiconductor layer sequence can exhibit as an active area, for example, a conventional pn junction, a double heterostructure, a single quantum well structure (SQW structure) or a multiple quantum well structure (MQW structure). Apart from the active area, the semiconductor layer sequence can comprise further functional layers and functional areas, for instance p- or n-doped charge carrier transport layers, that is to say electron or hole transport layers, p- or n-doped confinement or cladding layers, barrier layers, planarization layers, buffer layers, protective layers and/or electrodes and combinations thereof. Such structures relating to the active area or the other functional layers and areas are known to the expert, particularly with regard to configuration, operation and structure, and will therefore not be explained in greater detail at this point.

In a further embodiment, the first electronic element is suitably and preferably arranged for impressing on the optoelectronic component a pulsed current, the mean current of which can be controlled and changed in the manner described above by controlling the duty ratio in a first intensity range. During the on-time, the current intensity can be a current intensity suitable for the operation of the optoelectronic component so that the optoelectronic component can be operated under suitable conditions during the on-times. A high emission intensity of the optoelectronic component can be achieved by the off-times being minimized and, in particular, being preferably equal to zero. The emission intensity of the optoelectronic component can be reduced by changing the duty ratio in the form of extending the off-times and/or shortening the on-times. If, in this context, the on-time becomes too short with respect to the off-time, it may be possible that a flickering or stroboscopic effect is perceptible by the observer particularly during a movement of the optoelectronic device relative to an observer. It may therefore be possible to reduce the emission intensity by means of the first electronic element by changing the duty ratio of the pulsed current only to the extent that no or only a slight flickering or stroboscopic effect is just perceptible. Such emission intensity can thus be allocated a just permissible duty ratio. For example, a contrast ratio of 1 to 10 or 1 to 20 can be achieved in the first intensity range by impressing a pulsed current.

Furthermore, the second electronic element can be suitable and/or arranged for changing and controlling the current intensity of the current impressed on the optoelectronic component. By this means, the emission intensity of the optoelectronic component which is operated at the just permissible duty ratio can be reduced further in a second intensity range whilst no increase in the perception of flickering or of a stroboscopic effect can be registered at an observer.

In a further embodiment, the first electronic element is suitable and/or arranged for changing and controlling the current intensity of the current impressed on the optoelectronic component whilst the first electronic element is suitable and/or arranged for impressing a pulsed current on the optoelectronic component. As a result, the emission intensity of the optoelectronic component can be controlled and changed in a first intensity range by controlling the current impressed on the optoelectronic component until a minimum current intensity suitable for operating the optoelectronic component is reached. Especially with an LED as optoelectronic component, the light yield can be controlled with difficulty when a low current intensity is applied. For example, the emission intensity can be reduced up to a factor of 1 to 10 or 1 to 20 by means of the current control described. Controlling the duty ratio of the current applied by means of the second electronic element enables the emission intensity of the optoelectronic component to then be reduced further in a second intensity range and to be controlled in the second intensity range.

Furthermore, the first electronic element or the second electronic element can include an electrooptical dimmer instead of a current intensity control in both aforementioned embodiments.

As an alternative, the first electronic element or the second electronic element in the two aforementioned embodiments can include, instead of pulsed width modulation, an electrooptical dimmer so that the emission intensity can be controlled in the first and second intensity range, respectively, by means of current intensity control and by means of the electrooptical dimmer. This provides for an operation of the optoelectronic component in which any possible impression of flickering or of a stroboscopic effect can be prevented or reduced, respectively, at an observer.

In the embodiments described above, the coaction of the first and second electronic element thus enables the electromagnetic radiation emitted by the optoelectronic device to be controlled and changed in an overall intensity range which is extended with respect to the first and second intensity range.

In addition, the first and/or the second electronic element can additionally have an electrooptical dimmer so that the first intensity range and/or the second intensity range and/or the overall intensity range of the emission intensity of the optoelectronic device can be additionally extended compared with the previous embodiments.

In a further embodiment, the optoelectronic device has a plurality of optoelectronic components. As a result, the emission intensity of the optoelectronic device can be controlled by the respective emission intensities of the optoelectronic components of the plurality of optoelectronic components being controlled and/or changed.

Furthermore, the optoelectronic device can have a group of optoelectronic components and at least two optoelectronic components of the plurality of optoelectronic components can be combined to form the group. The optoelectronic device can in this case have a first electronic element which is suitable and/or arranged for changing the emission intensity in a first intensity range of the device in such a manner that the respective emission intensities of the at least two optoelectronic components of the group can be changed at the same time. For example, the emission intensities of the at least two optoelectronic components of a group, which can be interconnected in series or in parallel, can be controlled by the first electronic element. Thus, a first electronic element can be allocated to the at least two optoelectronic components of the group and control and change the respective emission intensities of the at least two optoelectronic components. As an alternative or additionally, a second electronic element can also be suitable and/or provided for controlling and changing the respective emission intensities of the at least two optoelectronic components of the group in the manner described above also within a second intensity range.

A group can have, for example, at least two optoelectronic components which, in operation, have the same emission intensity and/or electromagnetic radiation with the same spectrum and/or electronic radiation with the same direction of emission.

In a further embodiment, the optoelectronic device has a plurality of first and/or second electronic elements, wherein the emission intensities of the plurality of optoelectronic components can be controlled by different first and/or second electronic elements. For example, the optoelectronic device has at least one first optoelectronic component and at least one further optoelectronic component, wherein the device also has a first and/or a second electronic element for controlling the emission intensity of the first optoelectronic component and a further first and/or second electronic element for the at least one further component. Thus, the optoelectronic device can have at least two first and/or at least two second electronic elements which are in each case allocated to the first and the further optoelectronic component, respectively. By means of such a plurality of first and/or second electronic elements, the respective emission intensities of the at least two optoelectronic components of the plurality of optoelectronic components can be changed independently of one another within the first and/or within the second intensity range and can thus be controlled independently of one another. The first and the second optoelectronic component can in this case be allocated to a common group or to different groups.

Furthermore, the optoelectronic components of the plurality of optoelectronic components can be arranged in a plurality of groups so that the respective emission intensities of the groups can be controlled and changed independently of one another in the manner described above. In this context, the respective emission intensities of the optoelectronic components can be changed and controlled jointly within at least one of the groups by means of the same first and/or second electronic element in the manner described above or independently of one another by means of a plurality of first and/or second electronic elements.

In a further embodiment, at least two optoelectronic components of the plurality of optoelectronic components, in operation, in each case generate electromagnetic radiation with the same spectrum which, for example, can be single- or multicolored. By this means, the emission intensity of the electromagnetic radiation can be increased with the same spectrum for the optoelectronic device. By jointly or mutually independently controlling and changing the respective emission intensities, the emission intensity of the optoelectronic device can be controlled in the manner described above for this spectrum.

Furthermore, at least two of the plurality of optoelectronic components, in operation, can in each case generate electromagnetic radiation with different spectra. As a result, the optoelectronic device can provide for a mixed-color luminescence impression at an observer by means of superposition of the various spectra. The mixed-color luminescence impression can be variably controllable by controlling the respective emission intensities of the optoelectronic components.

In a further embodiment, an optoelectronic component or the optoelectronic components of the plurality of optoelectronic components is/are arranged in groups or clusters. In this context, a number of optoelectronic components belonging to a group or cluster can be arranged directly adjacently or also not adjacently. For example, the optoelectronic device comprises a carrier body with electrical connections, on which the optoelectronic components are arranged. Furthermore, one or more first and/or second electronic elements and/or one or more optical elements and/or one or more electrooptical dimmers can be arranged on the carrier body. The carrier body can in this case have or be, for example, a circuit board or a foil with conductor tracks which can provide for an arrangement of optoelectronic components in one plane and/or on one surface in chip-on-board technique or chip-on-film technique. Furthermore, the carrier body can also provide for a three-dimensional arrangement of the optoelectronic components and/or the aforementioned further elements on a plurality of surfaces of the substrate. Furthermore, the direction of emission and/or the distribution of emission of the optoelectronic device can also be controllable by means of a suitable spatial arrangement of a plurality of optoelectronic components and suitable control of the respective emission intensities of the optoelectronic components, for example if a first group of optoelectronic components has a direction of emission which differs from a direction of emission of a second group of optoelectronic components. In particular, at least two optoelectronic components or at least two groups of optoelectronic components can have different directions of emission so that a mean direction of emission of the optoelectronic device can be adjustable and can be controlled by means of separate control of the respective emission intensities of the at least two optoelectronic components or the at least two groups, respectively.

In a further embodiment, for example, LED color mixing units with an increased contrast ratio can be made possible. For this purpose, the optoelectronic device can be suitable and/or provided for having a controllable color locus of the emitted radiation. For example, the optoelectronic device can have for this purpose at least two groups of optoelectronic components which, in operation, generate electromagnetic radiation with different spectra, wherein the mixture of the electromagnetic radiations emitted by the at least two groups of optoelectronic components determines the color locus of the radiation emitted by the optoelectronic device and the color locus of the emitted radiation of the optoelectronic device can be adjusted by means of separate control of the emission intensity of the two groups. Mixing the different spectra of the at least two groups of optoelectronic components can thus result in a common color locus of the electromagnetic radiation emitted by the optoelectronic device.

Furthermore, the optoelectronic device can have a luminous area with controllable geometry, wherein the arrangement of at least two groups of optoelectronic components with respect to one another determines the geometry of the luminous area. The geometry of the luminous area of the optoelectronic device can be adjustable and controlled by separately controlling the respective emission intensities of the two groups. In addition, the optoelectronic device can have a multiplicity of groups of optoelectronic components and in each case the emission intensity of one group can be controllable independently of the emission intensity of another group. The location of the luminous area within the optoelectronic device can be given by the position of groups with higher emission intensity relative to groups with lower emission intensity, wherein the location of the luminous area can be controllable by separately controlling the groups with higher emission intensity and lower emission intensity.

By means of the embodiments described above, an optoelectronic device can be achieved, for example, which, for instance, can be used in a headlamp which requires variation of the emission intensity of the emitted electromagnetic radiation. For example, headlamps with dual or multiple functions such as, for example, a stop light/tail light combination, a daylight driving/position light combination, a controllable dipped/high beam combination or a headlamp with dynamic curve light in so called advanced-front-lighting (AFS) car headlamps are possible which require changes in the emission intensity within a range of more than 1 to 10 or more than 1 to 20 without causing a stroboscopic effect at an observer as described above. In particular, continuously variable brightness control (dimming) can also be achieved.

DETAILED DESCRIPTION OF THE DRAWINGS

In the illustrative embodiments and figures, identical or identically acting components can be provided in each case with identical reference symbols. In principle, the elements shown and their size relationships with respect to one another should not be considered to be true to scale but, instead, individual elements such as, for example, layers, component parts, components and areas can be represented excessively thick or largely dimensioned for better clarity and/or better understanding.

Figure 1A:
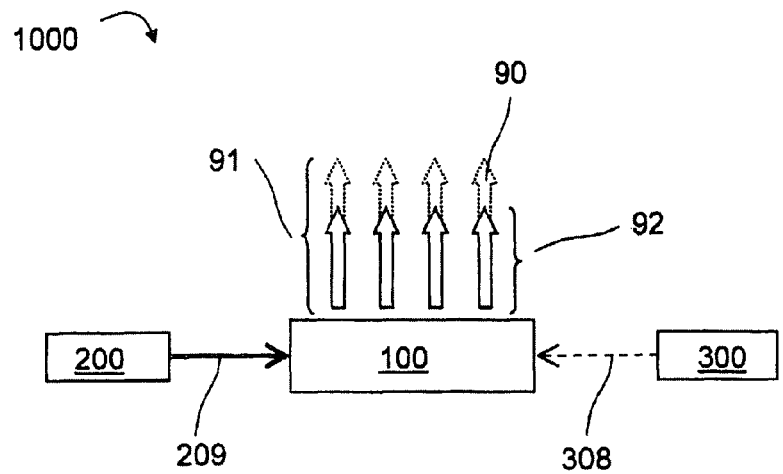
FIGS. 1A to 4C show diagrammatic representations of optoelectronic devices according to a number of illustrative embodiments.
Figure 1B:
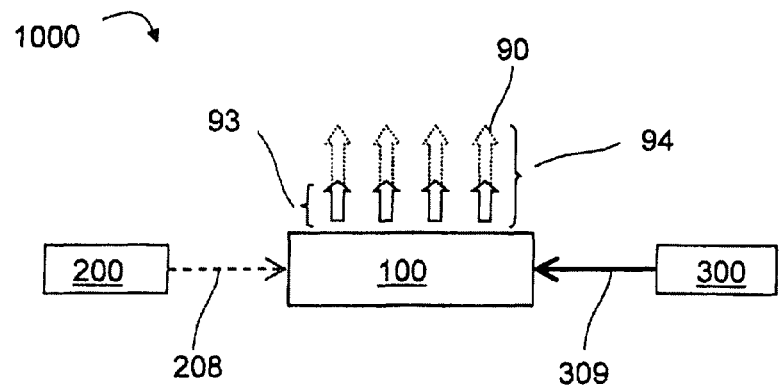

In the illustrative embodiment shown in FIGS. 1A and 1B, an optoelectronic device 1000 is shown which has an optoelectronic component 100 comprising an LED. The description following similarly relates to FIGS. 1A and 1B.

The optoelectronic component 100 is suitable, by means of the LED, for emitting electromagnetic radiation 90 in operation, that is to say when impressed with a current. The emission intensity of the optoelectronic component 100 corresponds here to the emission intensity of the optoelectronic device 1000 and is indicated by the length of the arrows 91, 92, 93, 94.

Furthermore, the optoelectronic device 1000 has a first electronic element 200. The first electronic element 200 is arranged here for controlling and changing the emission intensity of the electromagnetic radiation 90 within a first intensity range. As shown in FIG. 1A, the emission intensities forming the boundaries of the first intensity range are indicated here by arrows 91 and 92. As represented by continuous arrow 209, the first electronic element 200 can control the emission intensity from a maximum emission intensity 91 to an emission intensity 92. In this context, the first electronic element 200 shown in the illustrative embodiment controls emission intensity by pulse width modulation, that is to say by changing the duty ratio of the on- and off-times of the impressed current as described in the general section. The first electronic element 200 thus provides for control and change of the emission intensity of the electromagnetic radiation 90 within a contrast range that corresponds to the quotient of the emission intensities 91 and 92.

The optoelectronic device 1000 furthermore has a second electronic element 300 which can have a fixed influence on the optoelectronic component 100 within the first intensity range, but does not effect a variation of the emission intensity of the electromagnetic radiation 90 within the first intensity range. This is indicated by the dashed arrow 308. In the illustrative embodiment shown, the second electronic element 300 has an electrooptical dimmer as described above, which has fixed maximum transmission for the electromagnetic radiation 90 during the control of the emission intensity within the first intensity range. If the emission intensity of the electromagnetic radiation is controlled by means of the first electronic element 200 in such a manner that the emission intensity 92 is reached, further control of the emission intensity of the electromagnetic radiation 90 can be achieved in a second intensity range, identified by emission intensities 93 and 94, by means of the second electronic element 300. As shown in the present illustrative embodiment, the second intensity range can comprise lesser emission intensities than the first intensity range. Control of the emission intensity of the optoelectronic component 100 by means of the second electronic element 300 is indicated by the arrow 309 in FIG. 1B. In this context, the first electronic element 200 can have a fixed influence on the optoelectronic component 100, as is indicated by the dashed arrow 208 in FIG. 1B. In the illustrative embodiment shown, this means that the duty ratio of the impressed pulsed current, which leads to the emission intensity 92, is retained in the first electronic element 200 during the control of the emission intensity within the second intensity range. The emission intensity 94 thus corresponds to the emission intensity 92 so that the first intensity range and the second intensity range adjoin one another.

The emission intensity 93 is the minimum emission intensity of the second intensity range. Thus, control of the emission intensity of the electromagnetic radiation radiated by the optoelectronic device 1000 is possible by means of the first and second electronic elements within a contrast range which is given by the quotient of the emission intensities 91 and 93. The overall intensity range of the optoelectronic device 1000 is thus limited by the emission intensities 91 and 93, and is extended by comparison with the first intensity range and the second intensity range.

As an alternative, the minimum emission intensity 92 in the first intensity range can also be less than the maximum emission intensity 94 in the second intensity range so that control of the emission intensity of the optoelectronic device 1000 by means of both electronic elements 200, 300 is possible for emission intensities within the overlap area between the emission intensities 92 and 94.

As an alternative, the first electronic element 200 can also provide for control of the current intensity impressed on the optoelectronic component 100 instead of current control by pulsed width modulation.

The operations described above of the first and second electronic element 200 and 300 can also be exchanged so that the first electronic element 200 can have an electrooptical dimmer and the second electronic element 300 can have current control by pulsed width modulation or by current intensity control.

Figure 2A:
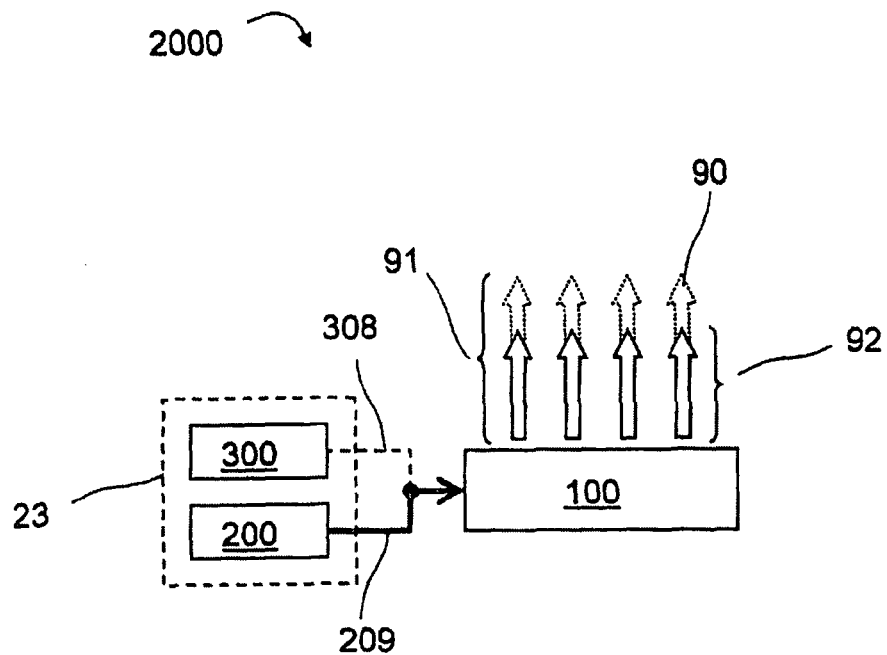
Figure 2B:
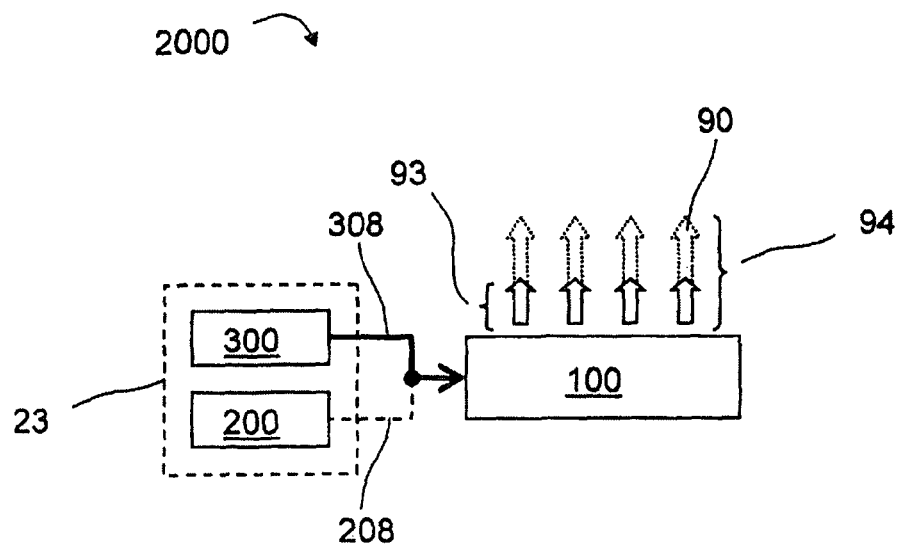

Like the preceding illustrative embodiment, the illustrative embodiment of optoelectronic device 2000 shown in FIGS. 2A and 2B has an optoelectronic component 100 which can be controlled and changed by means of a first electronic element 200 within a first intensity range between an emission intensity 91 and an emission intensity 92 (FIG. 2A), and by means of a second electronic element 300 within a second intensity range between an emission intensity 93 and an emission intensity 94 (FIG. 2B).

In contrast to the preceding illustrative embodiment, the optoelectronic device 2000 has an electronic interconnection of the electronic elements 200 and 300 indicated by the box 23. In the illustrative embodiment shown, the first electronic element 200 comprises current control by pulsed width modulation while the second electronic element 300 has current control by control of the current intensity.

In the present illustrative embodiment of the optoelectronic device 2000, as also in the preceding illustrative embodiment, the emission intensity in a first intensity range is achieved by means of pulsed width modulation as is indicated by the arrow 209. In this context, a current with a current intensity permanently set during control in the first intensity range is provided by a controllable current source which comprises the second electronic element 300, as indicated by the dashed arrow 308. The current provided is converted into a pulsed current with controllable duty ratio by means of the first electronic element 200.

When the emission intensity is controlled in the second intensity range, the duty ratio effected by the first electronic element 200 is retained while the current intensity is varied and controlled by means of the second electronic element 300, as indicated by continuous arrow 308 in FIG. 2B.

As an alternative, the functionalities of the first and second electronic element 200, 300 can also be interchanged.

Figure 3A:
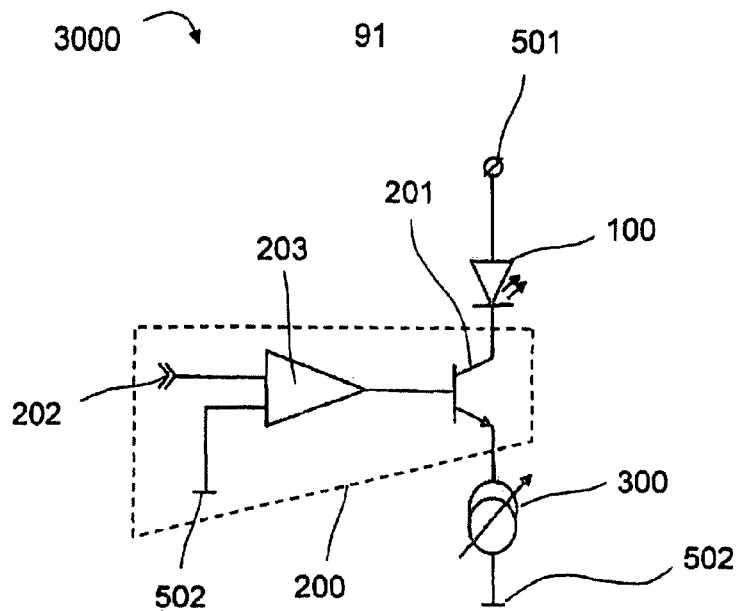
Figure 3B:
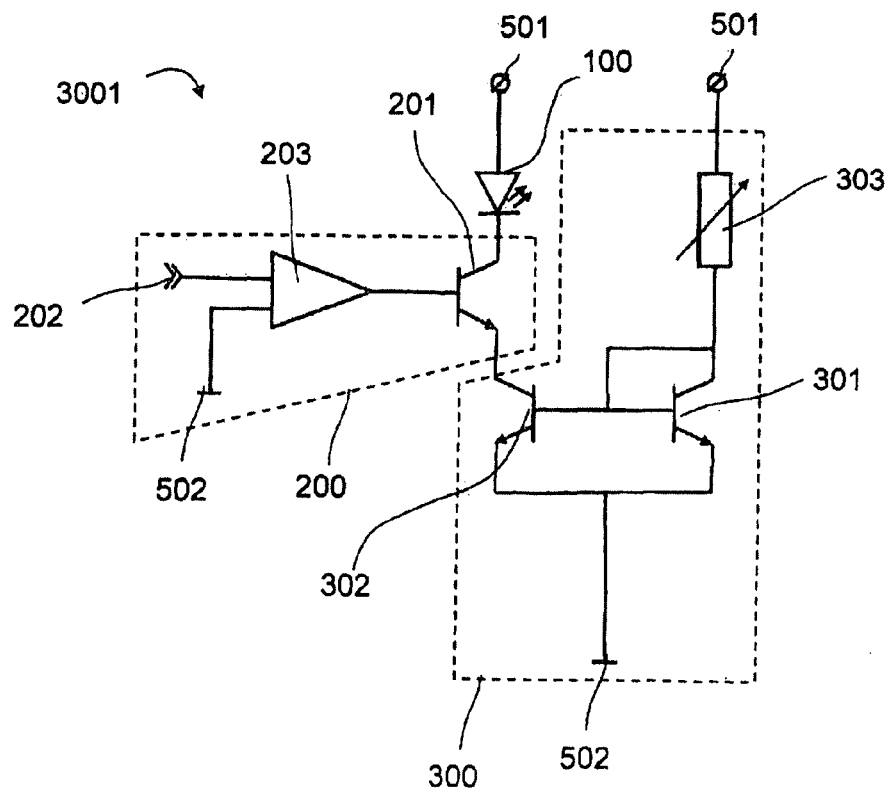

Special illustrative embodiments for the interconnection 23 are shown, for example, in the illustrative embodiments in conjunction with FIGS. 3A and 3B.

FIG. 3A shows an optoelectronic device 3000 with an optoelectronic component arranged as LED 100. The first electronic element 200 in this case has an electrically driveable switch 201, for example a transistor, via which a current impressed on the LED 100 can be alternately switched on and off in order to provide for control by means of pulsed width modulation. The switch 201 is connected via a pulsed width modulation input 202 to a pulse generator (not shown) which provides control signals for opening and closing the switch 201. The control signals of the pulse generator can be adapted into signals and/or signal forms suitable for the switch 201 by means of suitable further electronic components such as, for example, an operational amplifier 203 in the illustrative embodiment shown, or other amplifying and/or signal processing circuits.

Furthermore, the optoelectronic device 3000 has a second electronic element 300 in series with the LED 100 and the switch 201 between a supply voltage terminal 501 and a ground terminal 502. The second electronic element 300 is arranged as a controllable current source. As described in conjunction with FIGS. 2A and 2B, the controllable current source provides a current with a current intensity which is impressed on the LED 100 in the form of pulses generated by the first electronic element 200.

FIG. 3B shows a further illustrative embodiment of an optoelectronic device 3001 in which the second electronic element 300 has a controllable current source in the form of a current mirror with transistors 301, 302 and a control resistor 303 via which the current intensity of the current impressed on the LED 100 can be controlled and changed.

As an alternative, the devices 3000 and 3001 can also comprise in each case a plurality of LEDs 100 which are interconnected with one another in series and the respective emission intensity of which can be controlled jointly by means of the first and second electronic element 200, 300.

Figure 4A:
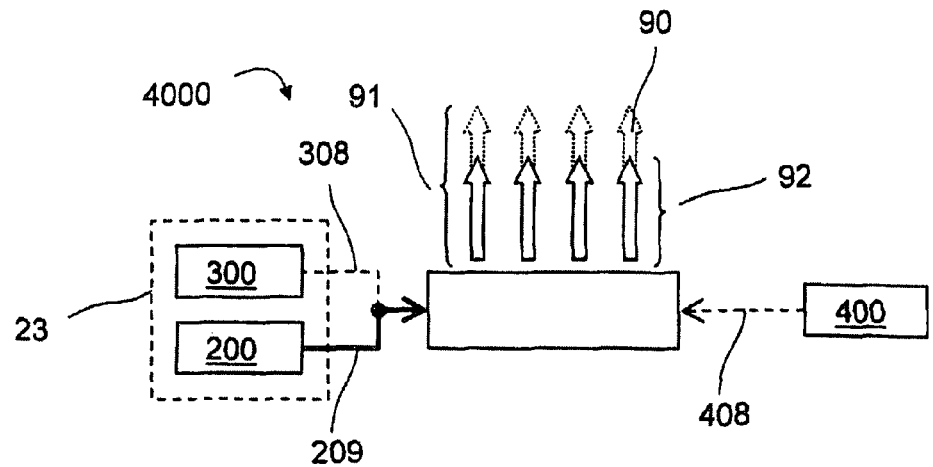
Figure 4B:
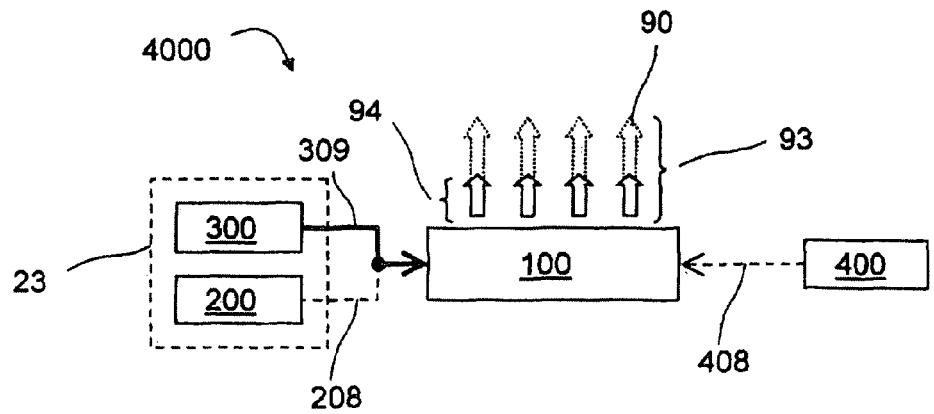
Figure 4C:
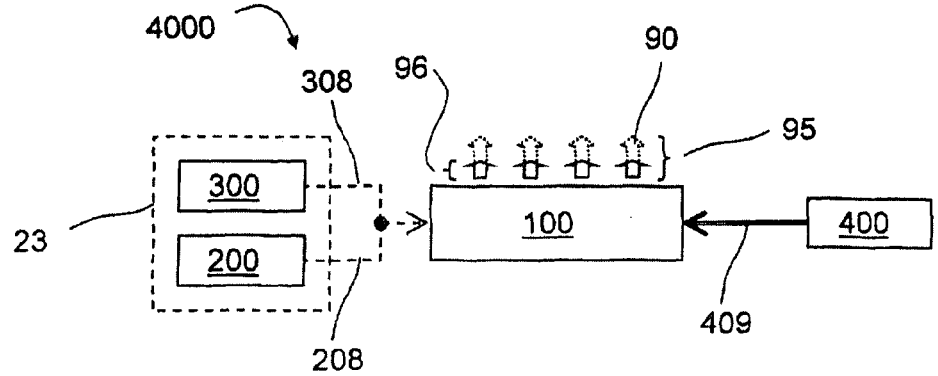

FIGS. 4A to 4C show an illustrative embodiment of an optoelectronic device 4000 which shows a combination of the illustrative embodiments shown in FIGS. 1A, 1B and 2A, 2B. In this arrangement, the optoelectronic device 4000 has an interconnection 23 which has electronic elements 200, 300 as described in conjunction with FIGS. 2A and 2B. The interconnection 23 thus enables the emission intensity of the electromagnetic radiation 90 generated by the optoelectronic component 100 to be controlled within two intensity ranges from an emission intensity 94 up to an emission intensity 91. The electronic embodiment can be effected in accordance with the illustrative embodiments of FIGS. 3A and 3B.

Furthermore, the optoelectronic device 4000 has a further electronic element 400 which, like the second electronic element 300 described in conjunction with FIGS. 1A and 1B is an electrooptical dimmer that has transmission which is controllable for the electromagnetic radiation 90. The optoelectronic device 4000 thus provides for multi-level control of the emission intensity of the electromagnetic radiation 90 generated by the optoelectronic component 100. Due to the coaction of the interconnection 23 in which the electronic elements 200 and 300 interact, with the further electronic element 400, control of the emission intensity of the optoelectronic device 4000 within an overall intensity range between emission intensities 91 and 96 can be achieved which is extended compared with the intensity ranges of the electronic elements 200, 300 and 400.

Figure 5A:
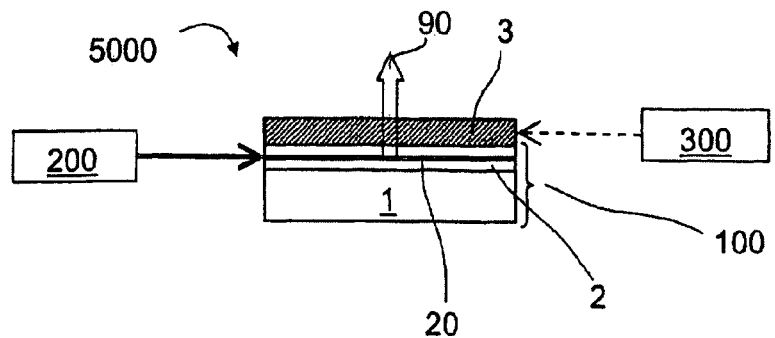
FIGS. 5A and 5B show diagrammatic representations of optoelectronic devices with an LED according to further illustrative embodiments.

The illustrative embodiment according to FIG. 5A shows a device 5000 which can be operated in accordance with the optoelectronic device 1000 according to the illustrative embodiment of FIGS. 1A and 1B. In this arrangement, the optoelectronic device 5000 has an optoelectronic component 100 which is arranged as an LED with a semiconductor layer sequence 2 on a substrate 1. In this arrangement, the semiconductor layer sequence 2 has an active area 20 which, in operation, is suitable for emitting electromagnetic radiation 90. Following the LED 100 immediately in the direction of emission of the electromagnetic radiation 90 is an electrooptical layer 3 as part of a second electronic element 300 arranged as electrooptical dimmer. In the illustrative embodiment shown, the electrooptical layer is applied to the LED 100. As an alternative, the electrooptical layer 3 can also be arranged above the LED 100, that is to say without mechanical contact.

Figure 5B:
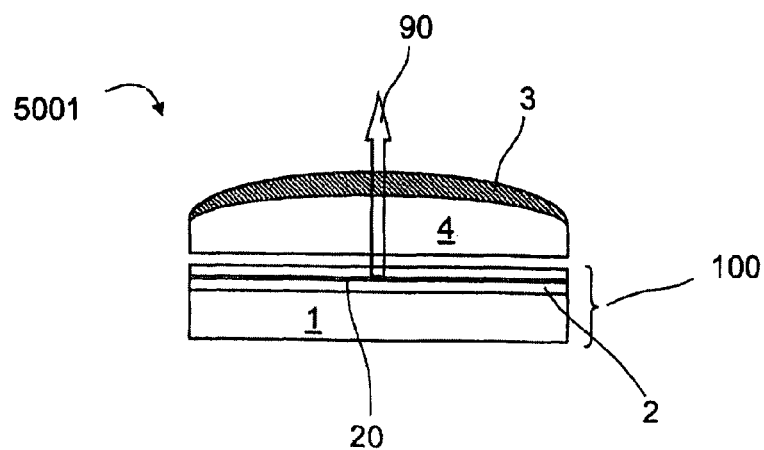

In the illustrative embodiment according to FIG. 5B, the optoelectronic device 5001 additionally has an optical element 4 which follows the LED 100 in the direction of emission of the electromagnetic radiation 90. In this arrangement, the electrooptical layer 3, as part of the second electronic element 300 as described in the preceding illustrative embodiment, directly follows the optical element 4 in the direction of emission of the electromagnetic radiation 90. In this arrangement, the electrooptical layer 3 is applied to the optical element 4. In the illustrative embodiment shown, the optical element 4 is a lens. Alternative and additional embodiments of the optical element are listed above.

Figure 6:
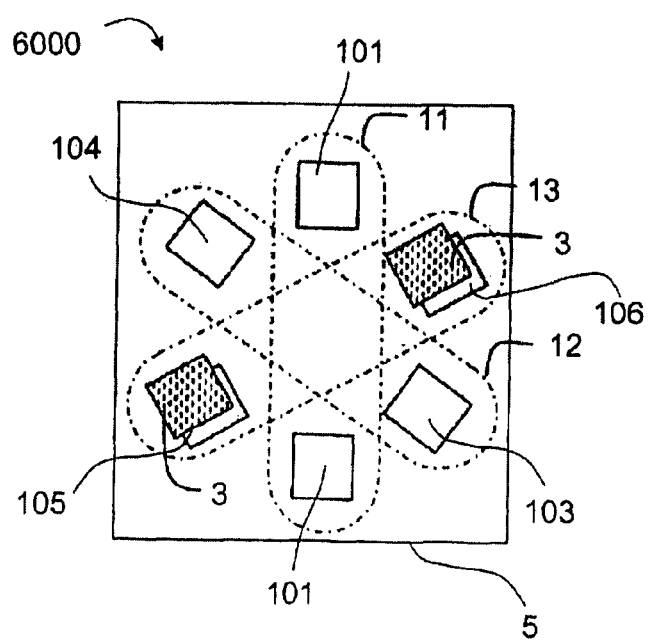
FIG. 6 shows a diagrammatic representation of an optoelectronic device with a plurality of optoelectronic components according to a further illustrative embodiment and FIGS. 7A to 8C show diagrammatic representations of methods for controlling the emission intensity of optoelectronic devices according to further illustrative embodiments.

FIG. 6 shows an illustrative embodiment of an optoelectronic device 6000 which has a plurality of optoelectronic components 101 to 106 on a carrier 5, for example a circuit board. The optoelectronic components 101 to 106, which are arranged as LEDs, are arranged here in a circle, in each case two opposite LEDs being combined to form one group. LEDs 101, 102 form a first group 11, LEDs 103, 104 form a second group 12 and LEDs 105, 106 form a third group 13. In this arrangement, the respective emission intensities of the LEDs of one group are controlled together by means of in each case the same first and second electronic element as described further above. The electronic elements not shown here are also arranged on the carrier 5 in this case. The resultant emission intensities of the respective groups 11, 12, 13 are controlled independently of one another. The first and second electronic elements can be arranged in accordance with one of the preceding illustrative embodiments. In the illustrative embodiment shown, LEDs 105, 106 of group 13 have an electrooptical dimmer 3 while control of the emission intensities of the other two groups 11 and 12 is achieved purely electrically. LEDs 101 to 106 can in each case generate electromagnetic radiation with the same spectrum or with different spectra, a pure brightness control of the optoelectronic device 6000 being possible in the first case by controlling the individual emission intensities while control of the color impression is also possible in the second case, in addition to brightness control.

Figure 7A:
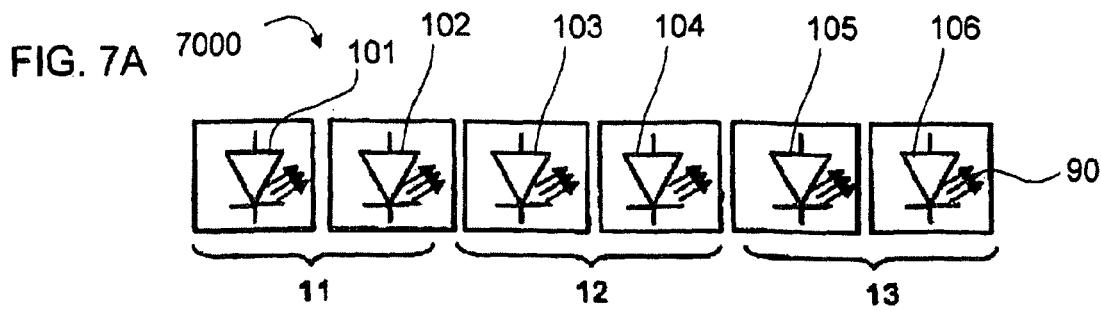
Figure 7B:
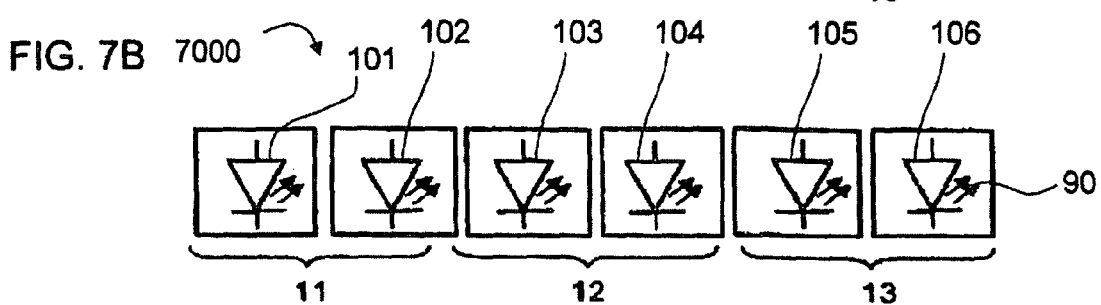
Figure 7C:
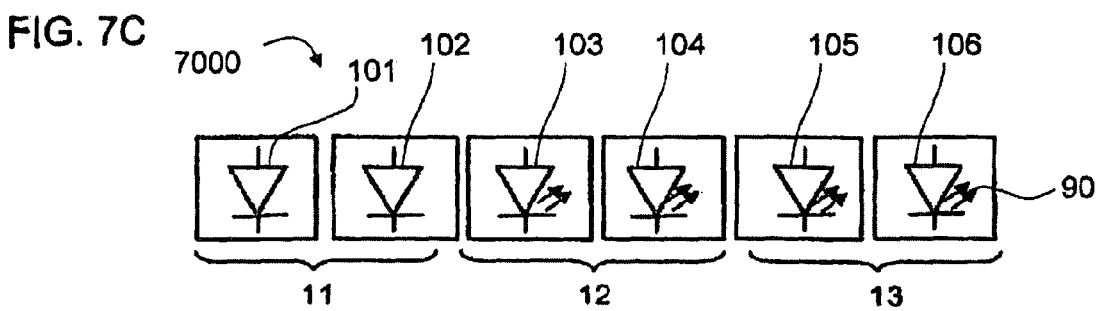
Figure 7D:
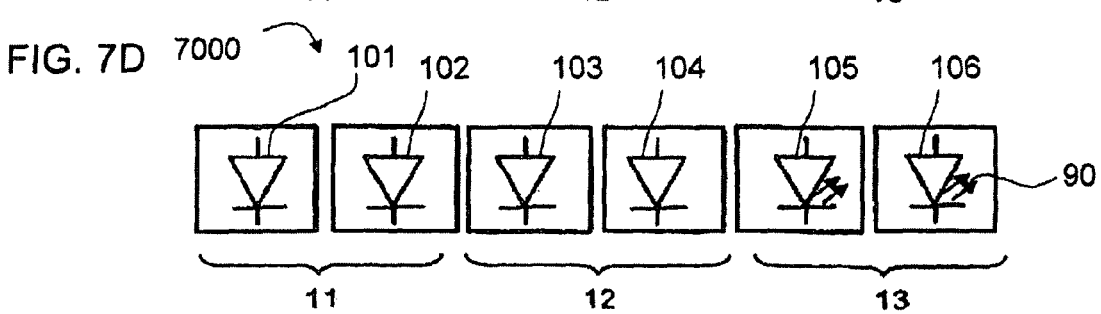
Figure 7E:
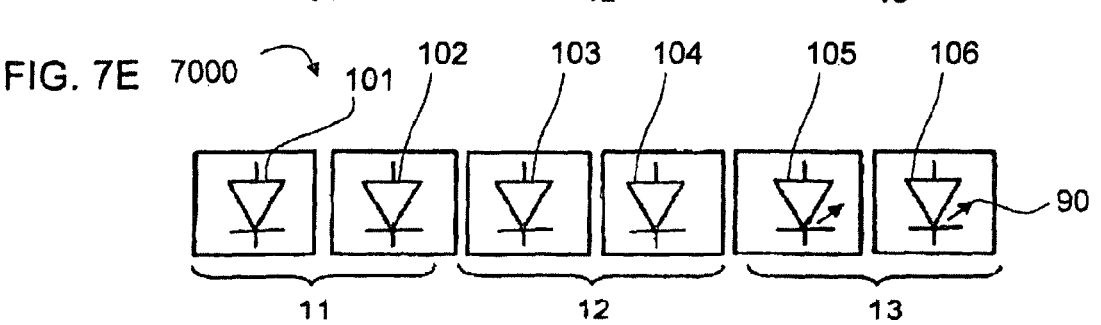

In the illustrative embodiment of an optoelectronic device 7000 shown in conjunction with FIGS. 7A to 7E, control of the emission intensity of the optoelectronic device 7000 is shown. The optoelectronic device 7000 can in this case be arranged like the optoelectronic device 6000 in the preceding illustrative embodiment and have LEDs which in each case generate electromagnetic radiation 90 having the same spectrum. FIG. 7A shows the optoelectronic device 7000 in operation with maximum emission intensity of each LED and thus with maximum emission intensity of the optoelectronic device 7000. FIG. 7B shows the optoelectronic device 7000 with reduced emission intensity, wherein the respective emission intensities of groups 11, 12, 13 have been reduced to the same extent by means of a first electronic element within a first intensity range. FIG. 7C shows a further reduction in the emission intensity, the reduction being achieved by switching off LEDs 101, 102 of the first group 11. This provides for a reduction in the emission intensity of the optoelectronic device 7000 by one third in comparison with the emission intensity in FIG. 7B, the emission intensities of groups 11, 12, 13 being controlled differently from one another. FIG. 7D shows a further reduction in the emission intensity of the optoelectronic device 7000 by further switching-off of LEDs 103, 104 of the second group 12. In FIG. 7E, the emission intensity of the optoelectronic device 7000 is reduced further within a second intensity range by a reduction of the emission intensity of the third group 13 by means of a second electronic element, for instance the electrooptical dimmer 3 as shown in FIG. 6. Arranging the plurality of LEDs 101 to 106 in groups and controlling the respective emission intensities of the groups by means of first and second electronic elements thus provides for variable control of the emission intensity of the optoelectronic device within a very large contrast range.

In addition, groups 11, 12, 13 can in each case have different directions of emission. As a result, the direction of emission of the optoelectronic device 7000 can also be changed and controlled by the control described previously, in addition to or instead of the emission intensity of the optoelectronic device 7000. Such a device can thus be used, for example, in a headlamp with multiple function, for example with daylight and position light, dipped-light and high beam and/or curve light or combinations thereof.

Furthermore, LEDs 101 to 106 can be perceptible spatially separately from one another. Thus, the location of the luminous area of the optoelectronic device 7000 can also be controlled and changed by means of the control of the emission intensities of groups 11, 12, 13 described before.

Figure 8A:
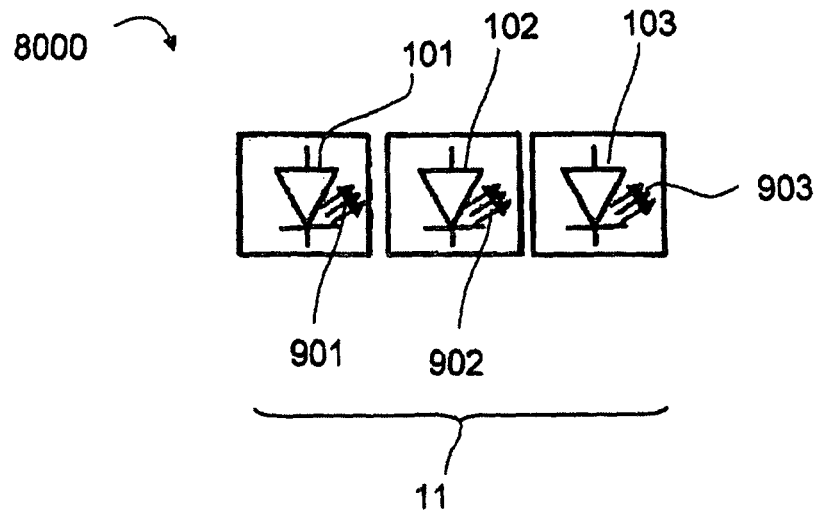
Figure 8B:
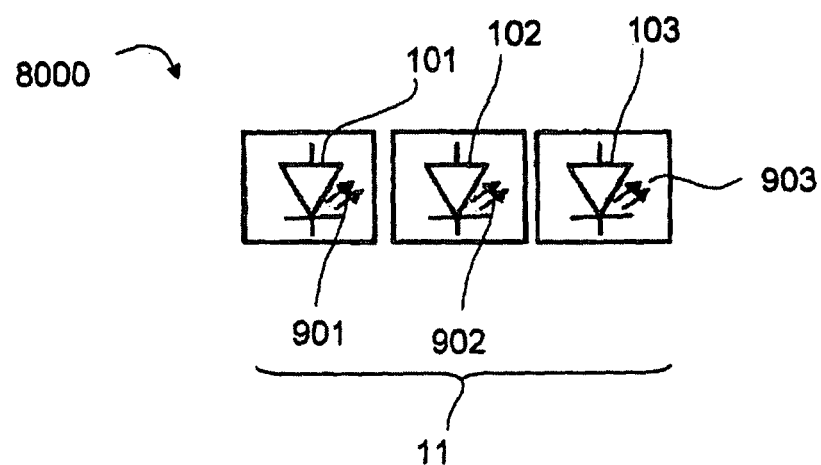
Figure 8C:
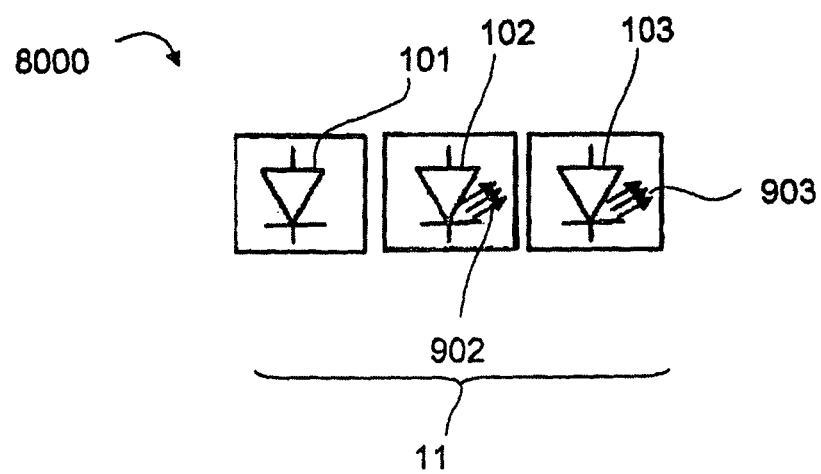

The illustrative embodiment according to FIGS. 8A to 8C shows an optoelectronic device 8000 with a group 11 with three LEDs 101, 102, 103 which can generate electromagnetic radiation 901, 902, 903 with in each case different spectra. The LEDs 101, 102, 103 in each case preferably generate electromagnetic radiation with a blue, a red and a green color impression, as a result of which both the emission intensity of the optoelectronic device 8000 and the color impression caused by mixing the respective spectra of the electromagnetic radiation 901, 902, 903 can be changed and controlled by individually controlling the emission intensities of the individual LEDs. FIG. 8A shows the optoelectronic device 8000 with a maximum emission intensity with uniform mixing of the respective spectra. For example, this makes it possible to achieve a white color impression with maximum brightness. FIG. 8B shows the optoelectronic device 8000 with reduced emission intensity, wherein the respective emission intensities of the LEDs 101, 102, 103 have been reduced uniformly within a first intensity range. This also produces a white color impression, but with reduced brightness. In comparison, FIG. 8C shows the optoelectronic device 8000 with a reduced emission intensity of LED 101 as a result of which a color impression differing from white can be caused. By controlling and changing respective emission intensities of LEDs 101, 102, 103 by means of first and second electronic elements, it is possible to achieve both an extended contrast range with regard to emission intensity of the optoelectronic device 8000 and an extended variability of the color impressions which can be represented in comparison with known light source. Furthermore, the optoelectronic device 8000 can also have a number of the groups 11, wherein the emission intensities of the LEDs of the groups which in each case generate electromagnetic radiation 901, 902, 903 with the same spectrum can be controlled by means of common first and/or second electronic elements.

Description by means of the illustrative embodiments does not restrict the invention to these. Instead, the invention comprises each new feature and any combination of features which, in particular, includes any combination of features in the patent claims even if this feature or this combination is not explicitly specified in the patent claims or illustrative embodiments.

We claim:
1. An optoelectronic device for emitting electromagnetic radiation with a controllable emission intensity, comprising:
    at least one optoelectronic component which is adaptable for generating, in operation, electromagnetic radiation;
    a first electronic element; and
    a second electronic element, wherein the first electronic element is configured to control the emission intensity of the electromagnetic radiation, generated by the optoelectronic component, within a first intensity range;

wherein the second electronic element is configured to control the emission intensity of the electromagnetic radiation, generated by the optoelectronic component, within a second intensity range;

wherein due to coaction of the first electronic element and the second electronic element, the optoelectronic device has an overall intensity range of the controllable emission intensity of the electromagnetic radiation which is extended in comparison to the first intensity range and the second intensity range; and wherein the first intensity range lies between a first maximum emission intensity of the electromagnetic radiation emitted by the optoelectronic device and a first minimum emission intensity, the second intensity range lies between a second maximum emission intensity and a second minimum emission intensity of the electromagnetic radiation emitted by the optoelectronic device, and an overall intensity range is limited by the second minimum emission intensity and the first maximum emission intensity.

2. The optoelectronic device according to claim 1, wherein the first intensity range and the second intensity range are at least partially different from one another.

3. The optoelectronic device according to claim 1, wherein the first intensity range and the second intensity range partially overlap.

4. The optoelectronic device according to claim 1, wherein the first intensity range and the second intensity range adjoin one another.

5. The optoelectronic device according to claim 1, wherein at least one of the first electronic element and the second electronic element are configured to control a mean current which, in operation, is applied to the optoelectronic component.

6. The optoelectronic device according to claim 5, wherein the mean current is controlled by at least one of pulsed width modulation and by controlling the current intensity.

7. The optoelectronic device according to claim 1, wherein at least one of the first and the second electronic element includes at least one element from a group formed by:
a current source having a controllable current intensity and a time-controlled switch.

8. The optoelectronic device according to claim 1, wherein one of the first and the second electronic element comprises an electrooptical dimmer which follows the optoelectronic component in a direction of emission and includes a controllable transmission for the electromagnetic radiation.

9. The optoelectronic device according claim 8, wherein the electrooptical dimmer comprises at least one of a thin film transistor and a liquid crystal layer.

10. The optoelectronic device according claim 8, wherein the electrooptical dimmer directly follows the optoelectronic component in the direction of emission.

11. The optoelectronic device according to claim 8, wherein the device further includes an optical element and the electrooptical dimmer directly follows the optical element in the direction of emission of the optoelectronic component.

12. The optoelectronic device according to claim 1, wherein the optoelectronic component comprises a semiconductor light emitting diode.

13. The optoelectronic device according to claim 1, wherein the device comprises a plurality of optoelectronic components.

14. The optoelectronic device according to claim 13, wherein at least two of the plurality of optoelectronic components are combined to form a group, wherein an emission intensity of the group is controllable simultaneously by a common first and second electronic element.

15. The optoelectronic device according to claim 13, wherein the optoelectronic device includes a plurality of at least one of the first and the second electronic elements; and
wherein emission intensities of the plurality of optoelectronic components are controllable by at least one of different first and second electronic elements, the device includes at least one of the first and second electronic element for at least a first one of the plurality of optoelectronic components, and the device includes at least one of a further first and a further second electronic element for at least a further one of the plurality of optoelectronic components.

16. The optoelectronic device according to claim 14,
wherein the device includes at least two groups with, respectively, at least one of the first and the second electronic element, and respective emission intensities of the at least two groups are controllable independently of one another by at least one of the respective first and the respective second electronic element.

17. The optoelectronic device according to claim 13, wherein at least two of the plurality of optoelectronic components respectively generate, in operation, electromagnetic radiation with an identical spectrum.

18. The optoelectronic device according to claim 13, wherein at least two of the plurality of the optoelectronic components generate, in operation, electromagnetic radiation with different spectra, respectively.

19. The optoelectronic device according to claim 16, wherein the optoelectronic device has a controllable color locus of the emitted radiation; and
wherein the at least two groups of optoelectronic components, in operation, generate electromagnetic radiation with different spectra, respectively,
a mixture of the electromagnetic radiations emitted by the at least two groups of optoelectronic components determines the color locus of the emitted radiation of the optoelectronic device, and
the color locus of the emitted radiation of the optoelectronic device is adjustable by separately controlling the emission intensity of the at least two groups.

20. The optoelectronic device according to claim 16, wherein the optoelectronic device has a luminous area having a controllable geometry; and
wherein an arrangement of the at least two groups of optoelectronic components with respect to one another determines a geometry of the luminous area, and the geometry of the luminous area of the optoelectronic device is adjustable by separately controlling the emission intensity of the at least two groups.

21. The optoelectronic device according to claim 20, wherein a location of the luminous area is controllable; and
wherein the optoelectronic device includes a multiplicity of groups of optoelectronic components, an emission intensity of one group is controllable independently of the emission intensity of another group and the location of the luminous area within the optoelectronic device is established by a position of groups having a higher emission intensity relative to groups having a lower emission intensity, and wherein the location of the luminous area is controllable by separately controlling the groups having the higher emission intensity and the lower emission intensity.

22. The optoelectronic device according to claim 13, wherein the plurality of optoelectronic components is arranged on a common carrier.

23. A method for controlling an emission intensity of an electromagnetic radiation generated in operation of an optoelectronic device, comprising the steps of:
generating the electromagnetic radiation by at least one optoelectronic component;
controlling an emission intensity of the electromagnetic radiation generated by the optoelectronic component within a first intensity range by a first electronic element; and
controlling the emission intensity of the electromagnetic radiation generated by the optoelectronic component within a second intensity range by a second electronic element;
wherein due to coaction of the first electronic element and the second electronic element, the emission intensity of the electromagnetic radiation of the optoelectronic device is controlled within an overall intensity range which is extended in comparison to the first intensity range and the second intensity range; and
wherein the emission intensity of the optoelectronic device in the first intensity range is controlled between a first minimum emission intensity and a first maximum emission intensity, the emission intensity of the optoelectronic device in the second intensity range is controlled between a second minimum emission intensity and a second maximum emission intensity, so that the emission intensity of the optoelectronic device within an overall intensity range is controllable from the second minimum emission intensity up to the first maximum emission intensity.

24. The method according to claim 23, wherein the first intensity range and the second intensity range are at least partially different from one another.

25. The method according to claim 23, wherein the first intensity range and the second intensity range partially overlap.

26. The method according to claim 23, wherein the first intensity range and the second intensity range adjoin one another.

27. The method according to claim 23, wherein the device includes a plurality of optoelectronic components, and the emission intensity of the device is controlled by controlling respective emission intensities of the plurality of optoelectronic components.

28. The method according to claim 27, wherein the device comprises a group of optoelectronic components and at least two of the plurality of optoelectronic are combined to form the group; and
wherein a combination of the first and second electronic element is used for jointly controlling the emission intensity of a group of optoelectronic components.

29. The method according to the claim 28, wherein the respective emission intensities of the at least two of the plurality of optoelectronic components are changed by at least one of a same first and second electronic element.

30. The method according to claim 28, wherein the emission intensity of the group is controlled at least one of within the first intensity range and within the second intensity range by changing the respective emission intensities of the at least two of the plurality of optoelectronic components of the group independently of one another.

31. The method according to claim 30, wherein the respective emission intensities of the at least two of the plurality of optoelectronic components are changed by at least two of the at least one of the first and the at least two second electronic elements.

32. The method according to claim 28, wherein the device includes a plurality of groups, and the respective emission intensities of the plurality of groups are controlled independently of one another.

33. An optoelectronic device for emitting electromagnetic radiation with a controllable emission intensity, comprising:
at least one optoelectronic component which is adaptable for generating, in operation, electromagnetic radiation;
a first electronic element; and
a second electronic element,
wherein the first electronic element is configured to control the emission intensity of the electromagnetic radiation, generated by the optoelectronic component, within a first intensity range;
wherein the second electronic element is configured to control the emission intensity of the electromagnetic radiation, generated by the optoelectronic component, within a second intensity range; and
wherein at least one of the first and the second electronic element includes at least one element from a group formed by:
a current source having a controllable current intensity and a time-controlled switch.

34. An optoelectronic device for emitting electromagnetic radiation with a controllable emission intensity, comprising:
at least one optoelectronic component which is adaptable for generating, in operation, electromagnetic radiation;
a first electronic element; and
a second electronic element,
wherein the first electronic element is configured to control the emission intensity of the electromagnetic radiation, generated by the optoelectronic component, within a first intensity range;
wherein the second electronic element is configured to control the emission intensity of the electromagnetic radiation, generated by the optoelectronic component, within a second intensity range; and
wherein one of the first and the second electronic element comprises an electrooptical dimmer which follows the optoelectronic component in the direction of emission and includes a controllable transmission for the electromagnetic radiation.

35. An optoelectronic device for emitting electromagnetic radiation with a controllable emission intensity, comprising:
at least one optoelectronic component which is adaptable for generating, in operation, electromagnetic radiation;
a first electronic element; and
a second electronic element,
wherein the first electronic element is configured to control the emission intensity of the electromagnetic radiation, generated by the optoelectronic component, within a first intensity range;
wherein the second electronic element is configured to control the emission intensity of the electromagnetic radiation, generated by the optoelectronic component, within a second intensity range;
wherein the device comprises a plurality of optoelectronic components; and
wherein at least two of the plurality of optoelectronic components are combined to form a group, the emission intensity of the group being controllable simultaneously by a common first and second electronic element.

36. An optoelectronic device for emitting electromagnetic radiation with a controllable emission intensity, comprising:
  at least one optoelectronic component which is adaptable for generating, in operation, electromagnetic radiation;
  a first electronic element; and
  a second electronic element,
  wherein the first electronic element is configured to control the emission intensity of the electromagnetic radiation, generated by the optoelectronic component, within a first intensity range;
  wherein the second electronic element is configured to control the emission intensity of the electromagnetic radiation, generated by the optoelectronic component, within a second intensity range;
  wherein the device comprises a plurality of optoelectronic components; and
  wherein the device includes a plurality of at least one of the first and second electronic elements, and emission intensities of the plurality of optoelectronic components are at controllable by least one of different first and second electronic elements,
  the device includes at least one of the first and second electronic elements for at least a first one of the plurality of optoelectronic components, and
  the device includes at least a further one of the first and second electronic elements for at least a further one of the plurality of optoelectronic components.

37. An optoelectronic device for emitting electromagnetic radiation with a controllable emission intensity, comprising:
  at least one optoelectronic component which is adaptable for generating, in operation, electromagnetic radiation;
  a first electronic element; and
  a second electronic element,
  wherein the first electronic element is configured to control the emission intensity of the electromagnetic radiation, generated by the optoelectronic component, within a first intensity range;
  wherein the second electronic element is configured to control the emission intensity of the electromagnetic radiation, generated by the optoelectronic component, within a second intensity range;
  wherein the device comprises a plurality of optoelectronic components; and
  wherein at least two of the plurality of the optoelectronic components generate, in operation, electromagnetic radiation with different spectra, respectively.

38. A method for controlling an emission intensity of an electromagnetic radiation generated in operation of an optoelectronic device, comprising the steps of:
  generating the electromagnetic radiation by at least one optoelectronic component;
  controlling the emission intensity of the electromagnetic radiation generated by the optoelectronic component within a first intensity range by means of a first electronic element; and
  controlling the emission intensity of the electromagnetic radiation generated by the optoelectronic component within a second intensity range by means of a second electronic element;
  wherein the device includes a plurality of optoelectronic components, and the emission intensity of the device is controlled by controlling respective emission intensities of the plurality of optoelectronic components;
  wherein the device includes a group of optoelectronic components formed by at least two of the plurality of optoelectronic; and
  wherein a combination of the first and second electronic elements is used to jointly control the emission intensity of the group of optoelectronic components.

* * * * *